United States Patent [19]

Vezirian et al.

[11] Patent Number: 4,486,104
[45] Date of Patent: Dec. 4, 1984

[54] COMPOSITE BEARING

[75] Inventors: Edward Vezirian, Irvine; Richard J. Ouinones, Garden Grove; Alan W. Lockstedt, Westminister, all of Calif.

[73] Assignee: Smith International, Inc., Newport Beach, Calif.

[21] Appl. No.: 557,560

[22] Filed: Dec. 2, 1983

Related U.S. Application Data

[62] Division of Ser. No. 334,499, Dec. 28, 1981.

[51] Int. Cl.³ ............................................. F16C 33/24
[52] U.S. Cl. ..................................................... 384/95
[58] Field of Search ................... 384/95, 92, 280, 282, 384/283, 284, 285; 175/372

[56] References Cited

U.S. PATENT DOCUMENTS 2,615,768 10/1952 Schluchter ........................... 384/284
2,757,055 7/1956 Davis ................................... 384/284
3,866,987 2/1975 Garner ................................. 384/95

FOREIGN PATENT DOCUMENTS 2300931 9/1976 France ................................. 384/95

Primary Examiner—Lenard A. Footland
Attorney, Agent, or Firm—Robert G. Upton

[57] ABSTRACT

A heavy-duty composite radial journal bearing and a method to produce it is described. A pattern of openings is formed through a bearing sleeve representing, for instance, axially aligned metal bars. The openings are subsequently filled with a metal dissimilar to the sleeve. Filling may be done with the sleeve in place either on a journal or in a housing, in which case the bearing becomes integral to that member by fusion. Alternately, the sleeve may be filled upon a nonwettable mandrel and subsequently used as a floating ring or as a bushing. Final finish machining reveals a pattern which exists throughout the bearing of alternating areas of relatively hard metal and a softer antigalling metal.

9 Claims, 3 Drawing Figures

U.S. Patent     Dec. 4, 1984     4,486,104
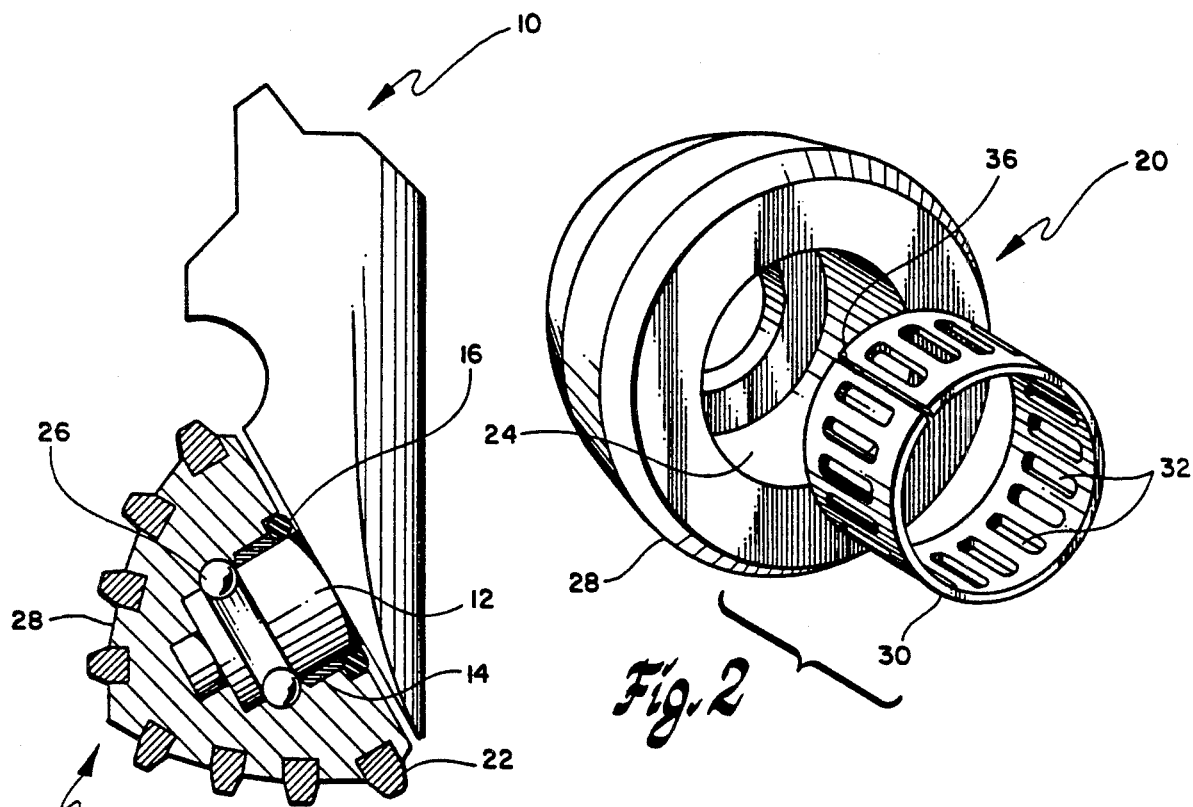
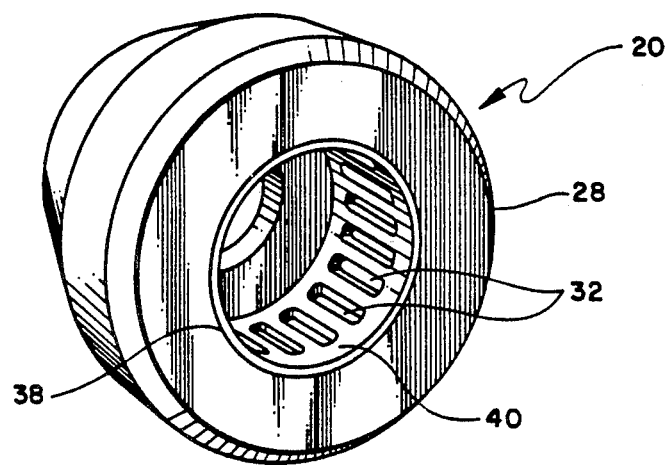

COMPOSITE BEARING

CROSS REFERENCE TO RELATED APPLICATIONS

This is a division of application Ser. No. 334,499 filed Dec. 28, 1981.

BACKGROUND OF THE INVENTION

1. Field of the Invention

Rotary rock bit bearings must serve in extremely severe conditions comprising very high loads, intense impact, heavy vibration, high temperatures and marginal lubrication. No single material can answer all the requirements imposed by such service equally well.

2. Description of the Prior Art

Engineers have long resorted to composite materials in bearing design to better the capabilities of their machinery. U.S. Pat. No. 356,331, issued in 1887 to Randolf, teaches the use of a soft bearing material and a hard fiber material placed to form alternating axial bars within the bearing surface.

More recently, U.S. Pat. No. 3,235,316 uses bars of nickel silver inlaid in a hard steel bearing. In U.S. Pat. Nos. 4,021,084 and 4,037,300, both issued to Garner and assigned to the same assignee as the present invention, similar inlays are used but of a material harder than the steel bearing. Forming the pockets for the inlays is a difficult procedure, such pockets being generally required in the blind bore of a rotary rock bit cutter. Our invention is directed, in part, at overcoming that problem of physical access.

U.S. Pat. No. 4,248,485 teaches etching some areas of the finished bearing so that those etched areas act softer than unetched areas whereas U.S. Pat. No. 4,232,912 teaches knurling the bearing surface deeply, fusing soft bearing metal to the knurl and finish grinding to expose a finely "gridded" pattern of the two metals. In both of these bearings, a relatively small amount of wear will result in the loss of one of the members of the composite surface. The bearings of a rock bit are expected to continue operating after very heavy wear and often are run to destruction. Bearings made by this new method will retain their composite character through destruction.

A sintered porous metal ring, impregnated with a plastic lubricator, is used in U.S. Pat. No. 4,207,658. This bearing is relatively limited in the amount of impact and load it can survive due to the naturally reduced density of the sintered porous metal.

The present innovation teaches beyond the foregoing state of the art in that the invention provides essentially homogeneous metals of substantial density and dimension to maximize resistance to heavy impact and load.

SUMMARY OF THE INVENTION

This invention provides a method for producing an improved heavy-duty radial journal friction bearing and the bearing so produced. This bearing was designed for use in a rotary rock bit, however, it is to be understood that such a bearing may be utilized advantageously in other rotary mechanisms.

The object of this invention is to provide a radial friction journal bearing having a working surface divided in a predetermined geometric pattern into a first substantial area of hard wear-resisting material and a second substantial area of relatively softer antigalling material. Both areas are of considerable depth so they may not be worn through in the lifetime of the bearing.

In any embodiment of this invention, the first step is to provide a right-cylindrical tube of appropriate dimensions, composed of one of the selected materials.

The tube is then fenestrated in the predetermined pattern to be presented by the second selected material. It must here be noted that openings through the wall of the tube may be formed with relative facility and accuracy owing to the free access and total visibility of the outer surface of the tube and, further, by the requirement that the openings go through instead of going to a certain depth.

The tube may then be placed within a bore in its intended housing or upon its intended shaft member, or against similarly shaped nonmetallic forms, and the fenestrations filled with the second selection material. Any conventional method may be used in applying the second metal which will ensure wetting and bonding of the first metal with the second, and, when installed in its housing or upon its shaft, to ensure wetting and bonding of the metal surface exposed by the fenestrations.

The bearing surface is then finish machined. If the filling was done against a form block for preparation as a floating ring element, then the tube should be cut axially through its length in at least one place to alleviate potential clearance problems caused by thermal conditions in use.

The above noted objects and advantages of the present invention will be more fully understood upon a study of the following description in conjunction with the detailed drawings.

BRIEF DESCRIPTION OF THE DRAWINGS

FIG. 1 depicts in partial cross section a portion of the lower structure of a typical rotary rock bit supporting a journal with a cutter cone rotatively mounted thereon with a bearing.

FIG. 2 is an exploded view showing a fenestrated tube prior to filling, illustrating an axial split for use as a floating ring and showing the cone as a housing.

FIG. 3 shows an unsplit, fenestrated tube installed in a housing cone ready to be filled in place.

DESCRIPTION OF THE PREFERRED EMBODIMENTS AND BEST MODE FOR CARRYING OUT THE INVENTION

In FIG. 1, a structural downward leg projection 10 of a rotary rock bit body supports a journal bearing 12 which is cantilevered downwardly and inwardly towards the bit axis of rotation. A bearing 14 is housed within a bore 24, formed in body 28 of a cutter cone 20. The cone 20 is rotatably mounted upon the journal 12 and is retained upon the journal by a plurality of bearing balls 26. A dynamic seal 16 serves to retain lubricant within the bearing surfaces and exclude foreign matter therefrom. A plurality of teeth 22 disintegrate rock as the cutter cone 20 rotates.

FIG. 2 illustrates a cutter cone 20 with a bore 24 formed in body 12. The bore 24 is finished to receive a floating ring bearing 30 which for clarity is shown partly constructed. Fenestrations or openings 32 will be filled with a dissimilar metal (not shown) prior to finish machining the bearing 30. After finish machining, an expansion slot 36 is provided.

Another embodiment is depicted in FIG. 3. The body 28 of a cutter cone 20 houses a bearing tube 38 with a plurality of previously formed fenestrations 32. The fenestrations 32 are to be filled with a dissimilar metal (not shown), wetting both the perimeters of the fenestrations 32 and surfaces of the cone body 28 exposed by the fenestrations 32. The bearing surface 40 will then be finish machined.

This invention concerns a heavy-duty radial friction bearing of improved construction and a method of producing such a bearing consisting of successive steps; forming a right-cylindrical bearing tube of a first metal; forming, in a predetermined pattern, a multiplicity of fenestrations through the metal of the tube; filling the fenestrations with a second metal, metallurgically wetting the first metal with the second, thus forming a composite bearing tube; and finish machining the composite tube to predetermined bearing dimensions. The bearing so produced is characterized by a pattern, of considerable depth, of alternating areas of relatively soft bearing metal to resist galling and relatively harder metal to resist wear and impact.

The relatively soft bearing metal is generally a selected copper base alloy.

The relatively hard metal is generally a selected ferrous base alloy but may involve the use of nickel, chromium, cobalt, tungsten, titanium, carbides of the foregoing metals, or any combination selected from this group.

One or more axial expansion slots may be used.

Another embodiment is offered when one composite combination of materials is desired on the inside diameter of a floating ring bearing to run on the material of the journal, and another combination of materials is selected to run against the material of the housing—one material of each combination being common and being the material of the perforated tube. The prepared tube is placed on a mandrel of ceramic or carbon and the openings are filled to a depth approximately equal to one-half the thickness of the tube with the selected second metal, wetting metallurgically the perimeter of each window with the second metal. Next, the exposed surface of the second metal and the perimeter of each pocket is wetted metallurgically with a third metal which is used to complete filling each pocket. A tube of alloy steel, beryllium copper as a second metal, and aluminum bronze as a third metal would represent an exemplary bearing of this design. This composite ring is removed from the mandrel, finish machined and cut axially to provide for expansion during use.

Alternate embodiments, not floating rings, are also included. The fenestrated tube may be placed within its housing and, when filled, the second metal wetting metallurgically the perimeters of the fenestrations and the surfaces of the housing exposed by the fenestrations, thus fusing the tube within the housing. Finish machining completes the integral bearing.

Similarly, the fenestrated ring may be placed upon a journal and filled, fusing it to the journal. Completion is by finish machining, making a bearing integral to the journal.

It will of course be realized that various modifications can be made in the design and operation of the present invention without departing from the spirit thereof. Thus, while the principal preferred construction and mode of operation of the invention have been explained in what is now considered to represent its best embodiments, which have been illustrated and described, it should be understood that within the scope of the appended claims, the invention may be practiced otherwise than as specifically illustrated and described.

We claim:

1. A radial friction bearing ring having composite bearing surfaces adjacent relatively rotating mating members, said ring having a predetermined pattern of circumferentially alternating areas of relatively soft bearing metal and relatively harder wear resisting metal; and wherein said radial friction bearing ring is a discontinuous cylindrical floating ring having a smaller inside diameter composite bearing surface of a first metal and a second metal, and a larger outside diameter composite bearing surface of said first metal and a third metal and wherein said predetermined pattern extends radially through said floating ring.

2. The invention as set forth in claim 1 wherein one of said composite bearing surfaces is integral to a shaft member.

3. The invention as set forth in claim 1 wherein one of said composite bearing surfaces is integral to a housing member.

4. The invention as set forth in claim 1 wherein said radial friction bearing ring is a discontinuous cylindrical floating ring having a smaller inside diameter composite bearing surface and a larger outside diameter composite bearing surface and wherein said predetermined pattern extends radially through said floating ring.

5. The invention as set forth in claim 1 wherein said radial friction bearing ring is incorporated in a rotary cone rock bit to rotatively mount a cutter cone to a downwardly and inwardly directed rock bit journal extending from a leg of said rock bit.

6. A radial friction bearing ring for a rotary cone rock bit, said bearing ring comprising a discontinuous cylindrical ring forming a predetermined pattern of a smaller inside diameter composite bearing surface of a first metal and a second metal, and a larger outside diameter composite bearing surface of said first metal and a third metal and wherein said predetermined pattern extends radially through said floating ring, said floating ring being positioned between a journal bearing and a rotary cone of said rock bit.

7. The invention as set forth in claim 6 wherein said first metal is an alloy steel.

8. The invention as set forth in claim 6 wherein said second metal is beryllium copper.

9. The invention as set forth in claim 6 wherein said third metal is aluminum bronze.

* * * * *